United States Patent [19]

Abbott et al.

[11] 3,764,742

[45] Oct. 9, 1973

[54] CRYPTOGRAPHIC IDENTIFICATION SYSTEM

[75] Inventors: George F. Abbott; Charles H. Gilley; Ralph O. Skatrud, all of Raleigh, N.C.

[73] Assignee: International Business Machines Corporation, Armonk, N.Y.

[22] Filed: Dec. 23, 1971

[21] Appl. No.: 211,616

[52] U.S. Cl. .......... 178/22, 235/61.7 B, 340/149 A, 340/172.5

[51] Int. Cl. .......... H04l 9/00, G06d 5/00

[58] Field of Search .......... 235/61.7 B; 178/22; 340/149 A

[56] References Cited

UNITED STATES PATENTS

| | | | |
|---|---|---|---|
| 3,641,497 | 2/1972 | Constable et al. | 340/149 A |
| 3,541,257 | 11/1970 | McCormick et al. | 178/22 |
| 3,702,392 | 11/1972 | St. Jean | 235/61.7 B |
| 3,657,521 | 4/1972 | Constable | 178/22 |
| 3,665,162 | 5/1972 | Yamamoto et al. | 235/61.7 B |
| 3,659,046 | 4/1972 | Angeleri | 178/22 |
| 3,678,198 | 7/1972 | Ehrat | 178/22 |
| 3,657,699 | 4/1972 | Rocher et al. | 178/22 |

*Primary Examiner*—Benjamin A. Borchelt
*Assistant Examiner*—H. A. Birmiel
*Attorney*—Edward H. Duffield et al.

[57] ABSTRACT

A cryptographic credit card device having a non-linear character generator based on a personalized read only storage and dynamic logic elements for manipulating data is disclosed.

10 Claims, 16 Drawing Figures

FIG. 4

| | IF INITALIZE & OUTPUT SET | (A) IF LOAD CYCLE COMP FF SET | IF SUB-CYCLE COUNTER = 1 | IF SUB-CYCLE COUNTER = 2 | IF SUB-CYCLE COUNTER = 3 | IF SUB-CYCLE COUNTER = 4 | IF KEY CHAR DEMAND CYCLE |
|---|---|---|---|---|---|---|---|
| TP0 | LOAD FIRST CHARACTER TO 2 CHARACTER BUFFER | LOAD SECTOR 1,2, 3, AND 4 COUNTERS, LOAD SECTOR CONTROL FF'S | CLEAR ACCUMULATOR KEY CHARACTER, CLEAR ADDRESS REG | CLEAR ADDRESS REGISTER | CLEAR ADDRESS REGISTER | CLEAR ADDRESS REGISTER | |
| TP1 | COMPLEMENT RECEIVE CHARACTER COUNTER | RESET CYCLE COUNTER TO 1 | IF SECT 1 CTRL FF=1, STEP SECT 1 CTR IF CYC CTR=2 OR 6 | IF SECT 2 CTRL FF=1, STEP SECT 2 CTR IF CYCLE CTR=3 OR 7 | IF SECT 3 CTRL FF=1, STEP SECT 3 CTR IF CYCLE CTR=4 OR 8 | IF SECT 4 CTRL FF=1, STEP SECT 4 CTR IF CYCLE CTR = 5 OR 9 | |
| TP2 | | SET 1 CYCLE FF | IF SECT 1 CTRL FF=1, READ SECT 1 COUNTER TO ADDRESS REG | IF SECT 2 CTRL FF=1, READ SECT 2 COUNTER TO ADDRESS REG | IF SECT 3 CTRL FF=1, READ SECT 3 COUNTER TO ADDRESS REG | IF SECT 4 CTRL FF=1, READ SECT 4 COUNTER TO ADDRESS REG | |
| TP3 | | SET FIRST KEY CHAR FF | IF TP2 COMPLETE, READ ADDRESS XXX FROM SECT 1 TO CHAR BUFFER | IF TP2 COMPLETE, READ ADDRESS XXX FROM SECT 2 TO CHAR BUFFER | IF TP2 COMPLETE, READ ADDRESS XXX FROM SECT 3 TO CHAR BUFFER | IF TP2 COMPLETE, READ ADDRESS XXX FROM SECT 4 TO CHAR BUFFER | |
| TP4 | LOAD SECOND CHARACTER TO 2 CHARACTER BUFFER | | XOR CHAR BUFFER WITH ACCUMULATOR KEY CHARACTER | XOR CHAR BUFFER WITH ACCUMULATOR KEY CHARACTER | XOR CHAR BUFFER WITH ACCUMULATOR KEY CHARACTER | XOR CHAR BUFFER WITH ACCUMULATOR KEY CHARACTER | SENSE KEY CHAR DEMAND |
| TP5 | SENSE RECEIVE CHAR CTR=1, SET LOAD COMPLETE CYC FF | | IF CYCLE CTR=1, STEP SECTOR, CTRS 1,2,3 AND 4 | | | IF CYC CTR=1 MOVE KEY CHAR TO SECT CTRL BUF, CLR SECT CTRL FF, REST GEN & 1 CYC | |
| TP6 | COMPLEMENT RECEIVE CHARACTER COUNTER | | | | | SENSE BIT 1=1, LOAD 1, 2,3,4 TO SECT CTRL FF, IF NOT=1, MOVE BITS 5,6,7,8 TO SECT CTRL FF | IF TP4 COMP, SEND ACCUM TO KEY CHAR BUF, IF 1ST KEY CHAR, CLR 1ST KEY CHAR FF |
| TP7 | | | STEP SUB-CYCLE COUNTER TO 2 | STEP SUB-CYCLE COUNTER TO 3 | STEP SUB-CYCLE COUNTER TO 4 | SENSE SECT CTRL FFS ALL=0, IF ALL=0 COMP TO 1-IF CYC CTR=1 SET GEN & 1 CYC FF | SET GEN FF AND 1 CYCLE FF, STEP CYCLE CTR, SET SUB-CYCLE CTR=1 |

RETURN TO (A)

FIG. 5 (FIG. 5A | FIG. 5B)

FIG. 5A

| KEY CARD INSERTED | CHARACTER COUNT<N INPUT SET | CHARACTER COUNT<N TRANSMIT SET | ACKNOWLEDGE FF AND RECEIVE FF SET | INIT FF SET AND RECEIVE SET 1ST TRANSMIT SET TO 1 |
|---|---|---|---|---|
| TP0 | IF CHAR READY MOVE CHAR TO N CHAR BUFFER | SENSE CHAR DEMAND PRESENT, MOVE CHAR FROM N CHAR, BUFFER TO TRANS BUFFER | SENSE REC CHAR PRESENT, MOVE TO RECEIVE BUFFER | SENSE REC CHAR PRESENT, MOVE TO RECEIVE BUFFER |
| TP1 | STEP N CHARACTER COUNTER | STEP N CHARACTER COUNTER | SENSE REC ACK, RESET ACK REC, IF NOT INIT, RESET REC FF TO 0 & RESET INPUT FF | MOVE CHAR TO N CHAR BUFFER STEP 2 CTR IF 1ST TRANS FF SET |
| TP2 | | IF ENCRYPT THEN XOR KEY BUFF AND TRANS BUFFER | IF NOT ACK RESET TRANS FF TO 1 | IF 2 CTR=2, RESET REC TO 0 AND SET OUTPUT FF |
| TP3 | | IF TP2 THEN SET KEY CHAR DEMAND FF | | CLEAR 1ST TRANSMIT FF TO 0 |
| TP4 | SENSE CHAR CTR=N SET TRANS FF | TRANS CHAR TO COMM LOGIC, SENSE CHAR CT=N, SET ACK FF & REC FF | | |
| TP5 | IF=N, CLEAR INPUT FF | IF N, RESET TRANSMIT FF TO 0 | | |
| TP6 | IF INIT FF SET & ID CORRECT FF NOT SET, SET ID COMPLETE | MOVE NEW KEY CHAR TO KEY CHAR BUFFER | | |
| TP7 | RESET N COUNTER TO 0 | CLEAR KEY CHARACTER DEMAND FF | | |

FIG. 5B

| INITIALIZE FF SET AND OUTPUT SET | INIT FF SET TO 1, RECEIVE FF SET TO 1 1ST TRANS FF=0 | RECEIVE FF SET | OUTPUT FF SET |
|---|---|---|---|
| SENSE CHAR DEMAND PRESENT, MOVE CHAR FROM N CHAR BUFFER TO KEY CARD | SENSE CHAR PRESENT-MOVE TO RECEIVE BUFFER | SENSE REC CHAR PRESENT, MOVE TO RECEIVE BUFFER | SENSE CHAR DEMAND PRESENT, SEND CHAR FROM N CHAR BUFFER TO OUTPUT |
| | SENSE ID CORRECT-SET ID CORRECT FF | STEP N CHARACTER COUNTER | STEP N CHARACTER COUNTER |
| | CLEAR INIT FF TO 0 RESET REC TO 0 | IF DECRYPT XOR KEY BUF AND REC BUFFER | |
| | | IF DECRYPT, SET KEY CHAR DEMAND FF | |
| MOVE SECOND CHARACTER TO KEY CARD | | LOAD RECEIVE CHAR TO N CHAR BUF | |
| | | IF N CTR=N, RESET REC FF, SET OUTPUT FF | IF N CHAR CTR=N CLEAR OUTPUT FF |
| CLEAR OUTPUT FF | | MOVE NEW KEY CHAR TO KEY CHAR BUFFER | IF N CHAR CTR =N, AND END OF TEXT FOR REC NOT PRESENT, RESET REC FF |
| | | | CLEAR KEY CHARACTER DEMAND FF |

KEY CARD GENERATING CAPACITY

| ROS SIZE (BITS) | n | CAPACITY $X^n(2^{n-1})$ | BYTES OR # CHARACTERS IN ROS |
|---|---|---|---|
| 64 | 1 | 8 | 8 |
| 128 | 2 | 192 | 16 |
| 192 | 3 | 3,584 | 24 |
| 256 | 4* | 61,440 | 32 |
| 320 | 5 | 1,015,808 | 40 |
| 384 | 6 | $1.65 \times 10^7$ | 48 |
| 484 | 7 | $2.66 \times 10^8$ | 56 |
| 511 | 8 | $4.26 \times 10^9$ | 64 |

* FIGURE 3 HAS 45,056 CHARACTER CAPACITY DUE TO ARBITRARY LOGIC LIMITATION IMPOSED BY NOT USING COMBINATIONS LESS THAN 2.

CRYPTOGRAPHIC IDENTIFICATION SYSTEM

BACKGROUND OF THE INVENTION

This invention relates to communications systems access control devices, identification systems, and cryptographic communications in general. In particular, it relates to a credit card type of device for use in the commercial field for secure communications and personal identification.

PRIOR ART

For reasons of security and privacy, and to prevent unauthorized usage of a data communications terminal or a computer input/output station, it is desirable to be able to identify an authorized individual at a local station. Additionally, for the transmission of restricted data for which added security is desired, a means for insuring privacy and security in such a way as to discourage unauthorized monitoring while the data is being transmitted is desirable. Furthermore, the security devices should be inexpensive, require a minimum of maintenance, and impose a minimum of inconvenience in their use. Security devices should also be difficult to duplicate and should be constructed in such a way that attempts to tamper with them are both immediately obvious or rendered ineffectual by destruction of a part of the device. Furthermore, those parts of a system which uniquely identify an individual should be carried by the individual at all times, such as one might carry a key.

Various devices and systems have been previously constructed in attempts to meet and satisfy some of the above criteria. All have suffered from one or more of a variety of shortcomings. Key and lock devices of the mechanical type suffer from a limited number of combinations, are subject to picking and other mechanical avoidance techniques, require maintenance and lose their security value if an individual key is lost, (particularly where numerous keys are adapted to fit the lock.) Furthermore, mechanical lock and key systems do not, of themselves, provide any security for the data which is transmitted; they provide no information as to the identity of the key bearer and are easily copied by unauthorized persons if they are found out of the possession of the bearer for a short time. To combat these shortcomings, electronic systems seem to pose an answer.

Electronic identification keys and systems have been built based on a variety of schemes. Electrical permutations or combination locks have been constructed and, while these offer a higher number of possible combinations than some mechanical keys, they are subject to a variety of ills such as corrosion, contact pitting, wear, etc., and they can be picked and otherwise tampered with. They provide no security for the transmitted data and no information as to the identity of the user. The degree of protection afforded by such a system is proportional to the length and difficulty of the code or combination which must be memorized; this imposes additional difficulties in actual use of such a system which has an adequate difficulty factor to discourage picking. Furthermore, since the device must usually be open and visible, unauthorized persons may observe the correct sequence of usage by a given person who is authorized and later duplicate his efforts. Similarly, the electrical system may be monitored to learn the coded sequence or combination which is required.

Still other electronic devices operate on the principle of a coded array of resistors, coded permutations of connections, and capacitive circuitry which changes frequencies in a selected manner to serve as a type of electronic "key" to a holder of an encoded device. While these afford an additional measure of security over typical mechanical keys and locks, they are subject to the same types of electrical surveillance as ordinary electrical combination locks and the security of the system is compromised by the loss to or obtaining of a given card or key device by an unauthorized person. Additionally, maintenance of the system is a continual problem where electrical contacts, frequency measuring devices, and the like, must be kept in continual good working order. As a further drawback, such devices can be copied if an authorized holder leaves possession of his key device to an unauthorized person.

High security cryptographic communications systems have previously been developed utilizing the concept of mixing the data to be transmitted with a randomly generated signal which is generated at the receiving end of the communication line again to unmix the transmitted signal and clear the data. These systems are, however, complex, costly, and unless the cryptographic device itself is carried by an authorized user, subject to having their security compromised by the unauthorized entry of an individual to the communications terminal by such ordinary means as picking locks, etc. Finally, these systems are only as secure as the code which is used to transmit the data and the randomness of the mixed signal to which such data may be added.

OBJECTS OF THE INVENTION

In view of the foregoing and other problems in the prior art, it is an object of this invention to provide an improved identification and cryptographic device, the loss or unauthorized use of which does not compromise the security of the system.

It is a further object of this invention to provide an improved security and identification device which cannot be duplicated by an unauthorized source and for which an analysis of its contents, even if possible, does not provide the unauthorized user with access to the system and which does not compromise the security of the system for other users.

It is a further object of this invention to provide an improved cryptographic device which may be individualized for a wide variety and number of persons and carried by them without a threat to the system from the loss or unauthorized tampering with a given device.

Still another object of this invention is to provide a cryptographic device which cannot be tampered with in an unobvious manner.

It is a further object of this invention to provide a cryptographic identification system which is relatively inexpensive, flexible, and requires low maintenance and has a very high order of security.

SUMMARY OF THE INVENTION

The foregoing and other objects of the invention are achieved by implementing a personalized read only storage device (ROS) onto a "credit card." The card holds the ROS-associated logic and devices to utilize the read only storage to generate pseudo-random strings of code data. The pseudo-random code is mixed with data which may be transmitted to a computer. The computer contains a pattern of the user's individual read only storage and it operates in sequence to generate the same pseudo-random string of bits to decrypt the mixed encrypted data from the user. It is also used to transmit data back in encrypted form. Access to the CPU is controlled by requiring the operator to memorize an access code which is unique to him, or to those in his authorized group, and to simultaneously present a valid card for testing by the CPU.

The operator's memorized code is unique, and so is his identification card or encryption and decryption device. If he does not have a valid communication encryption device, or if he does not have a proper memorized code, access to the system will be denied. Communication with the system will be impossible without the valid encryption-decryption card.

BRIEF DESCRIPTION OF THE DRAWINGS

FIG. 4 is a timing chart for the functions of the key card portion of the system illustrated in FIGS. 1 through 3.

FIG. 5 (consisting of parts 5*a* & 5*b*) is a timing chart for the functions of the input and output control logic illustrated in FIGS. 1 and 2.

GENERAL DESCRIPTION

Figure 1A:
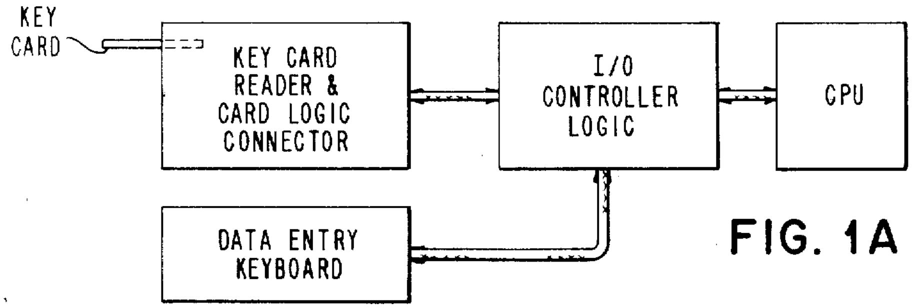
FIG. 1*a* is a block schematic diagram of the cryptographic indentification system.

In a preferred embodiment of this invention, the operator is provided with a "credit card" which will act as his electronic key, identification device, and cryptographic coder/decoder. This key or card has logic and a personalized read only storage or memory on it. It is implemented on one or more FET chips or other suitable large scale integrated circuit technology devices which can embody the numerous logic devices and the memory element utilized in this invention. The read only storage (ROS) can be visualized as a matrix of cross points, each of which can store a 1 or 0 bit value in a permanent fashion which cannot be changed by either the operator or the manufacturer once it is built. The operator uses his card by inserting it into a reader device which forms a part of the input/output controller illustrated in FIG. 1. The controller may form a part of a data communications terminal for communication with a computer or may be an identification station for controlling the access to secured or controlled access areas.

Figure 1B:
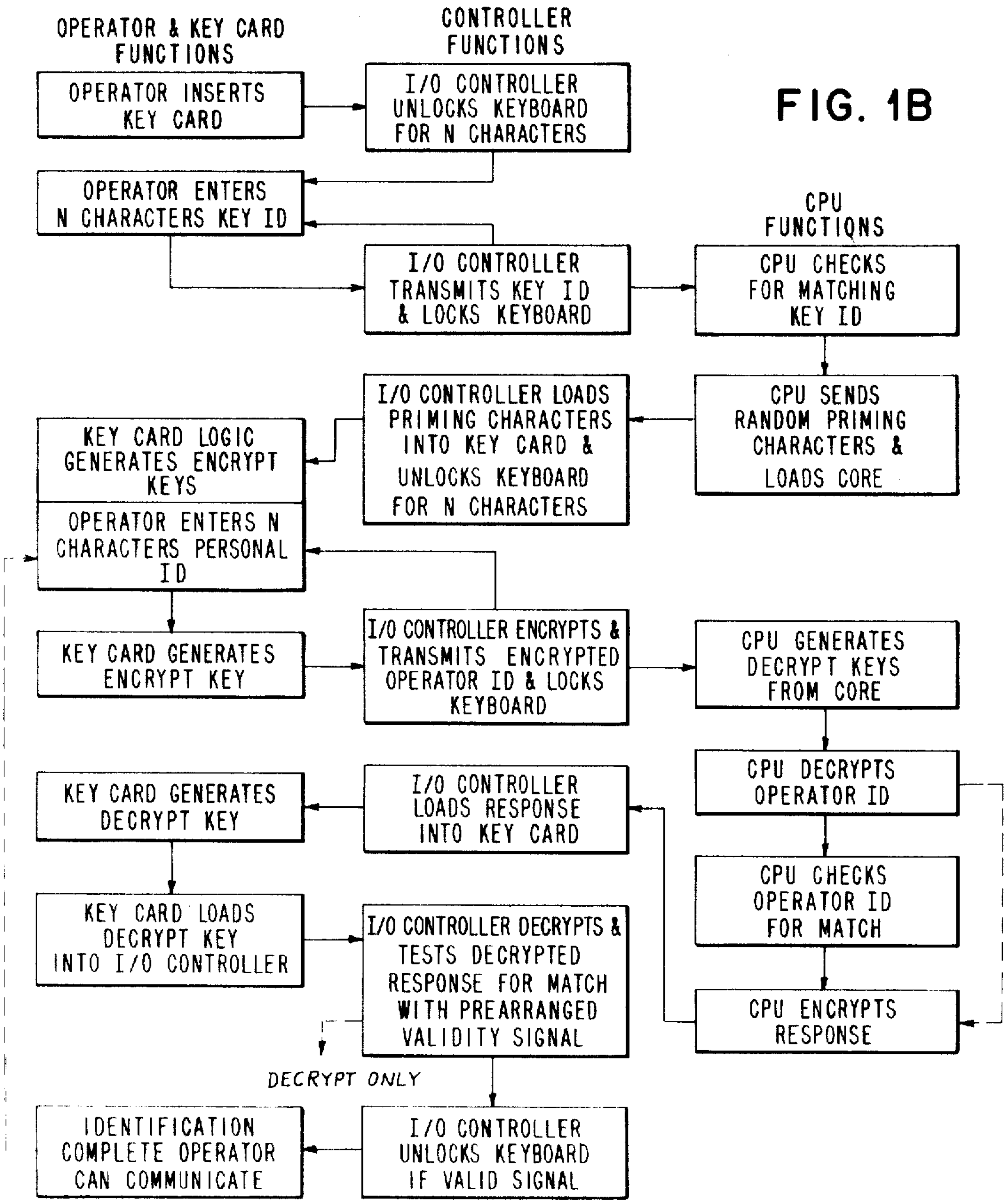
FIG. 1*b* is a flow chart of the functions of the system in FIG. 1*a* during valid identification procedures.

Upon inserting this key or card into the card reader, which begins the initialization sequence shown in FIG. 1*b*, the operator closes a set of contacts which energizes the controller logic to sense the presence of the card and unlock the input device or keyboard for the entry of N characters of data input by the operator. These N characters form a code number known only to the individual operator and, if valid, to the CPU. The code number identifies to the CPU or response unit the particular ROS which is carried on the card held by the operator. In a typical embodiment, 256 bits (or four sectors of 64 bits equal to 8 eight-bit characters or bytes) of information may be stored in the ROS which is sufficient to generate 61,440 eight-bit bytes or characters from these 256 bits. Enough unique ROS configurations can be constructed utilizing 32 eight-bit bytes to supply $2^{256}$ (or about $9 \times 10^{76}$) operators each with his individualized ROS pattern and his own complete encryption-decryption code generator.

Figure 6:
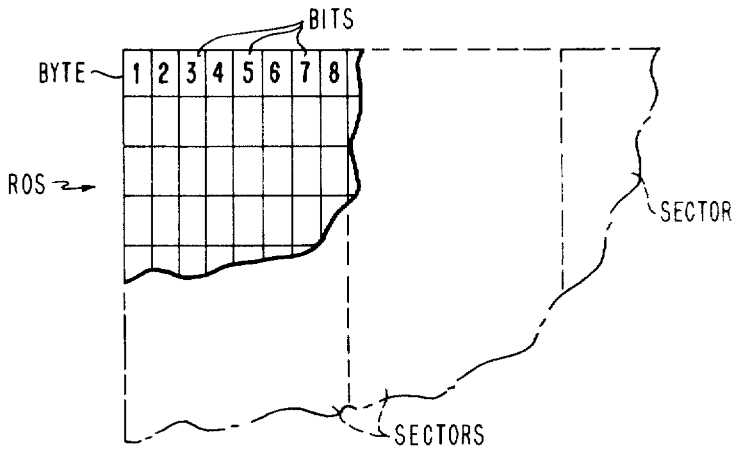
FIG. 6 is a table showing key generating capacity as a function of ROS size and sector size.

Key card encryption-decryption key generating capacity, expressed as the number of multi-bit bytes or characters which can be generated by the invention before a repeat occurs, is illustrated in FIG. 6. As illustrated in the table of FIG. 6, the capacity is a function of ROS size and of sector size. A sector is defined as some arbitrary sub-unit of the ROS such as an eight-bit wide column running the length of the ROS. Capacity may be mathematically shown to be: $X^n (2^n-1)$, where X is the number of characters in a sector one byte in width and n is the number of such sectors. The table of FIG. 6 is constructed by choosing X arbitrarily as eight, and then letting n vary upward beginning with one.

This table is dependent upon the particular type of non-linear character generation scheme used. In the present embodiment, the sector and counter controls and the exclusive "ORing" process which will be discussed, can easily be varied to suit the needs of the user. In general, however, the more highly non-linear generators are preferred because of the more nearly random sequence of keys which results. Any pseudo-random bit generator could be used, with resulting changes in capacity, and this invention is independent of the particular generator chosen as many other "random" bit generators as well-known in the art, and could be implemented on FET chips in similar fashion to the present embodiment.

Continuing in FIG. 1*b*, the N characters entered by the operator are transmitted to the CPU or response means which first inspects the number of incoming characters to see if a valid code has been transmitted. This is the second check point in the identification sequence; the first being that the operator must actually possess a key card to begin the identification sequence. If the N characters transmitted to the CPU are of sufficient number to form a prima facie valid code identifying an ROS, the CPU then inspects a table of ROS identification codes to see if the N characters match one of the ROS identification codes stored in a memory. Assuming that a corresponding code is found in the computer's memory, a third check point has been successfully passed, and the computer utilizes data stored in association with the matching identification code number to reconstruct in its registers an image of the read only storage possessed by the operator card identified by the code number. (The entire bit pattern of each ROS may be stored on a disc or other file for access by the computer once a valid identification code has been found.)

Any general purpose digital computer may be employed for this purpose. The techniques of table searching and comparison are well-known in the art of computer programming, and are not here discussed further. The same is true of the register storing routine which constructs from an identified data file the image of the ROS on the key card. Similarly, all of the logic functions carried out by the circuitry on the key card, which will be explained later, can easily be implemented in routine fashion in a computer by addressing and manipulating various storage and operating registers, and by utilizing the data therein to perform the operations which are done by the key card logic circuits. The specific techniques for manipulating data internally of a CPU vary from machine to machine and are well-known to any person skilled in programming a particular machine. The statement of operation is applied to the circuitry of the key card can be easily applied by a programmer to build a program to perform the same functions in the same order to obtain the same logical results. These basic techniques are the same processes long familiar to any programmer and will not be discussed further here, as the reference manuals for each computing machine are replete with instructions for such operations. It should be noted that, while a CPU is prescribed in the discussion of the invention, it can be replaced, if desired, by a whole series of physical key cards kept in a file from which a matching card to the operator's is selected and used in the transmission of encrypted data and in the decryption of received data. A CPU is merely an easily implemented device for duplicating the key card circuitry and logic functions. The invention, in this case, resides in the key card itself, and in the combined system as a whole rather than in any specific CPU which finds utility in carrying out the invention.

For one who is unfamiliar with modern digital computers, their structure, mode of operation, programming and capabilities a more complete description will be found in U. S. Pat. No. 3,400,371, issued Sept. 3, 1968, and assigned to the same assignee as the present application. This patent fully describes a computer processing system capable of carrying out all of the functions specified for the CPU or response means in the present application and is to be regarded, for purposes of description, as a part of this application.

Having constructed an image of the unique ROS carried by the operator as identified by his N character code, the CPU then selects from a table in memory or other data source two pseudo-random characters which are independently generated and sends them to the input/output controller. It also keeps these characters to initialize a key generating function based on the read only storage image which has been identified by the N key characters.

The input/output controller, still in its initialization condition, receives the two pseudo-random characters from the CPU or response means and passes them on to the key card as "priming" characters to be used for starting the key generating function.

When the key card receives the priming characters, the logic on the key card in conjunction with the ROS, goes through a complete bit generating routine and furnishes the first of a new set of unique key characters to the input/output controller. These characters are generated as a function of the bit pattern in the particular ROS carried on the key card in response to the particular characters utilized to prime the logic for the key generator. The operator enters N characters which he has memorized as his personal identification code. The input/output controller holds these N characters until the transmission process begins.

As the transmission process begins, the first key character is mixed with the first of N characters entered by the operator, which results in encrypting the first character of operator identification. While it is being transmitted, the second key character is being generated. When the second of the N characters of operator identification is ready, it is mixed with the second key character.

The process continues as the input/output controller transmits the encrypted N characters to the CPU. Upon receiving the encrypted N characters of identification, the CPU generates N key characters from the ROS equivalent in its memory which was identified in the first portion of this sequence, and uses these to decrypt the incoming data. Assuming that the operator has a valid key card, knows a valid identification code for the ROS on the card, and knows his own valid identification number, the data received at the CPU will match identification data for the operator on file at the CPU when the incoming data is decrypted. The decryption is accomplished by unmixing the incoming data by utilizing the N key characters generated from the ROS equivalent identified by the operator in the first step of the sequence. This results in a recreation of the N character identification of the operator which was entered at the terminal. This is a fourth check point in the sequence. The CPU will then check a table of decrypted operator identification codes. If it finds a match, the CPU will send back one prearranged encrypted character indicating that the identification is complete. The encryption-decryption mixing process used herein is that of Exclusively ORing the N characters of data with N key characters which are generated by the key generator on the card.

This process may be visualized from the following table which uses hypothetical characters and keys in which the Exclusive OR circuit produces a "0" if bits in corresponding positions are the same and a "1" if they are not the same:

| | |
|---|---|
| Character to be encrypted: | 10110010 |
| Key card generated encryption "key": | 11010110 |
| Result of XOR process: | 01100100 |
| Encrypted code for transmission: | 01100100 |
| Response means generated decryption key: | 11010110 |
| Decrypted result of XOR process: | 10110010 |

Note that the character has been transmitted in encrypted form and decrypted using the same "key." These "keys" are generated by the key card and by the CPU in the same order of occurrence as each generator runs through the entire sequence of "keys" which it can generate. Synchronism is inherent because each outgoing or incoming character triggers a new generation cycle and thus, steps through another "key" in each generator's repertoire. Since both generators are started at the same point by the previously mentioned "priming" characters, the "keys" are generated in the same order for each end of the communication system.

Figures 2, 2A:
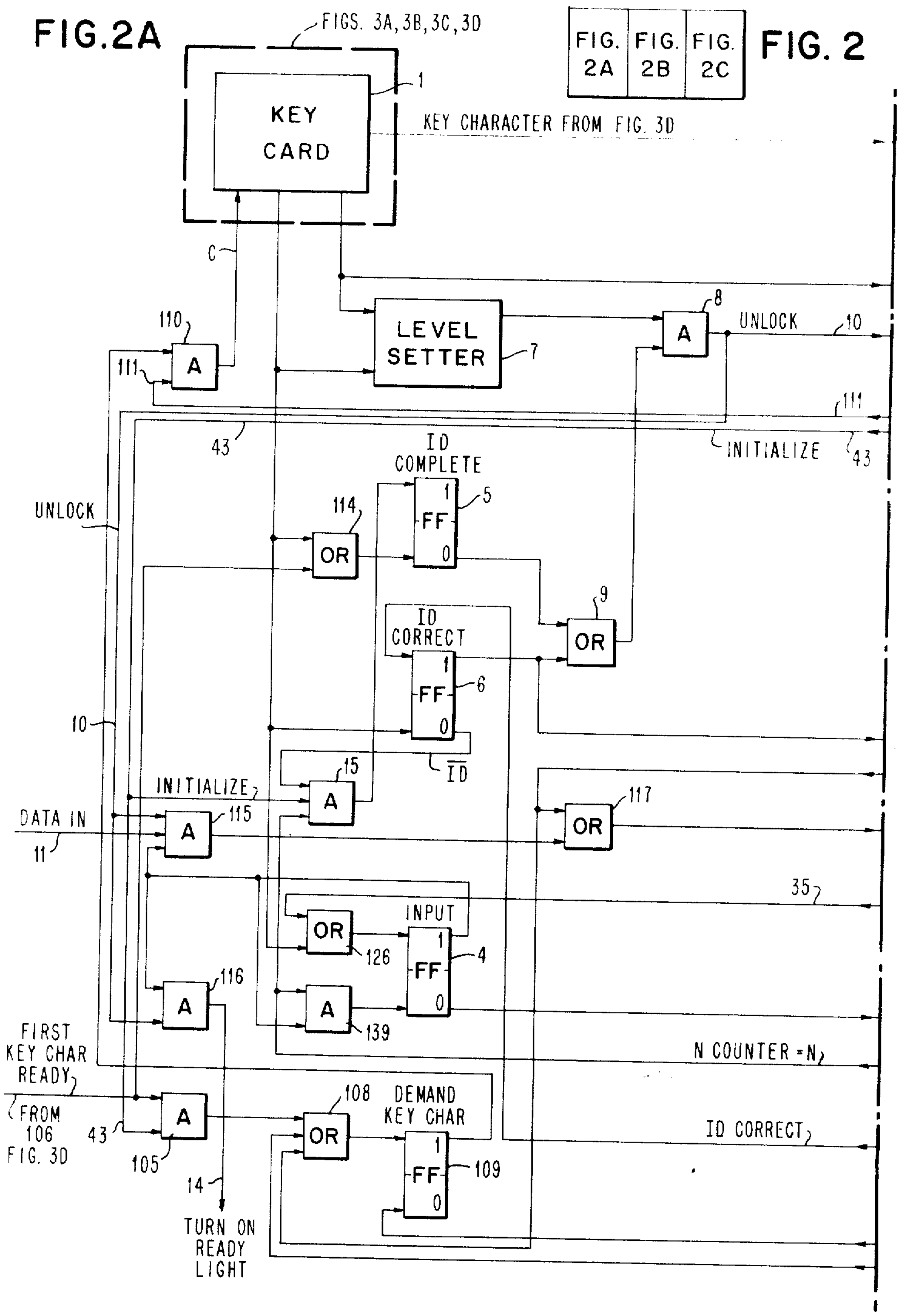
FIG. 2 is a layout showing the arrangement of the sheets of drawings which make up FIGS. 2*a* through 2*c*.
FIGS. 2*a* through 2*c* illustrate system logic circuits for one embodiment of the invention.
Figure 2B:
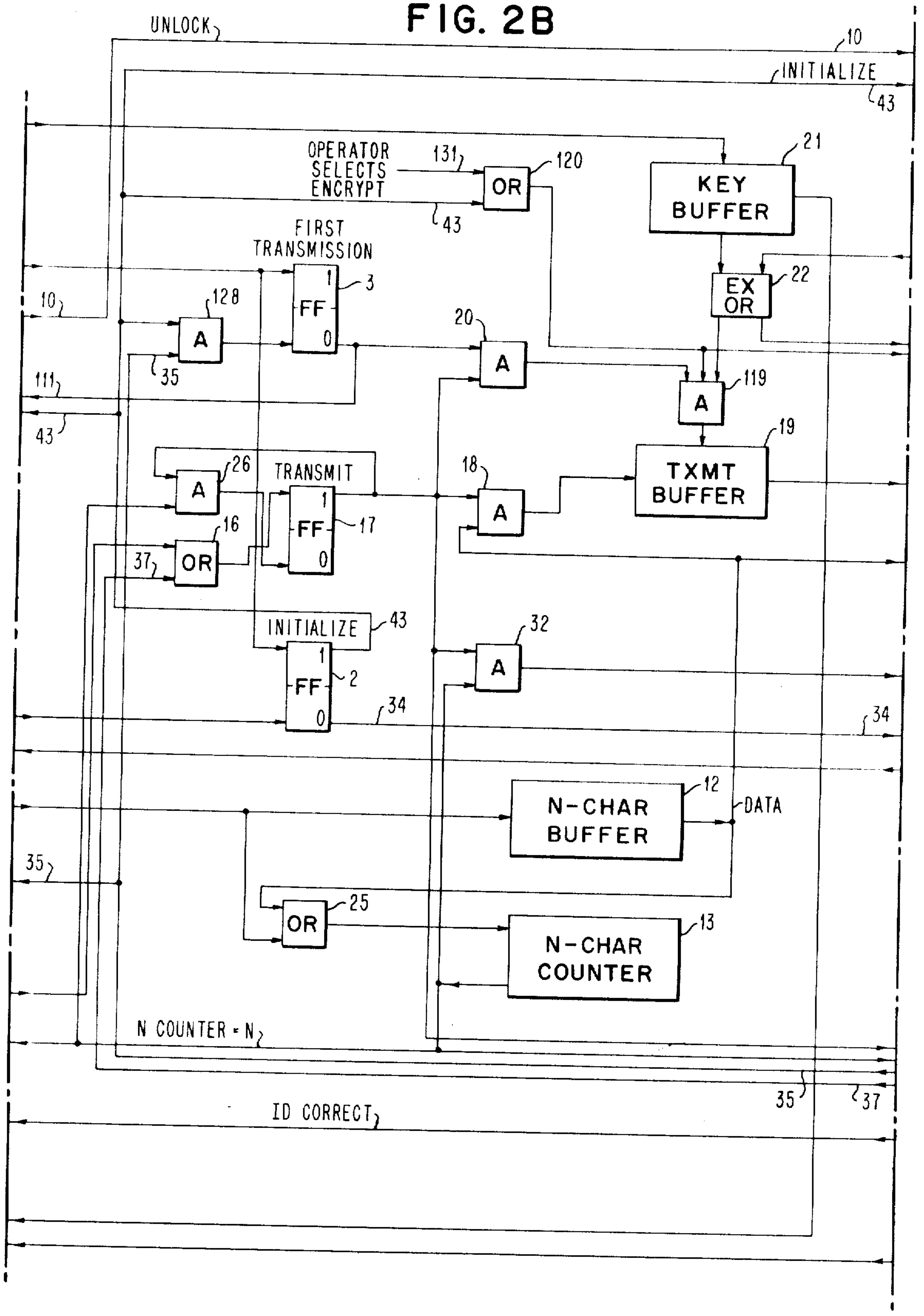
Figure 2C:
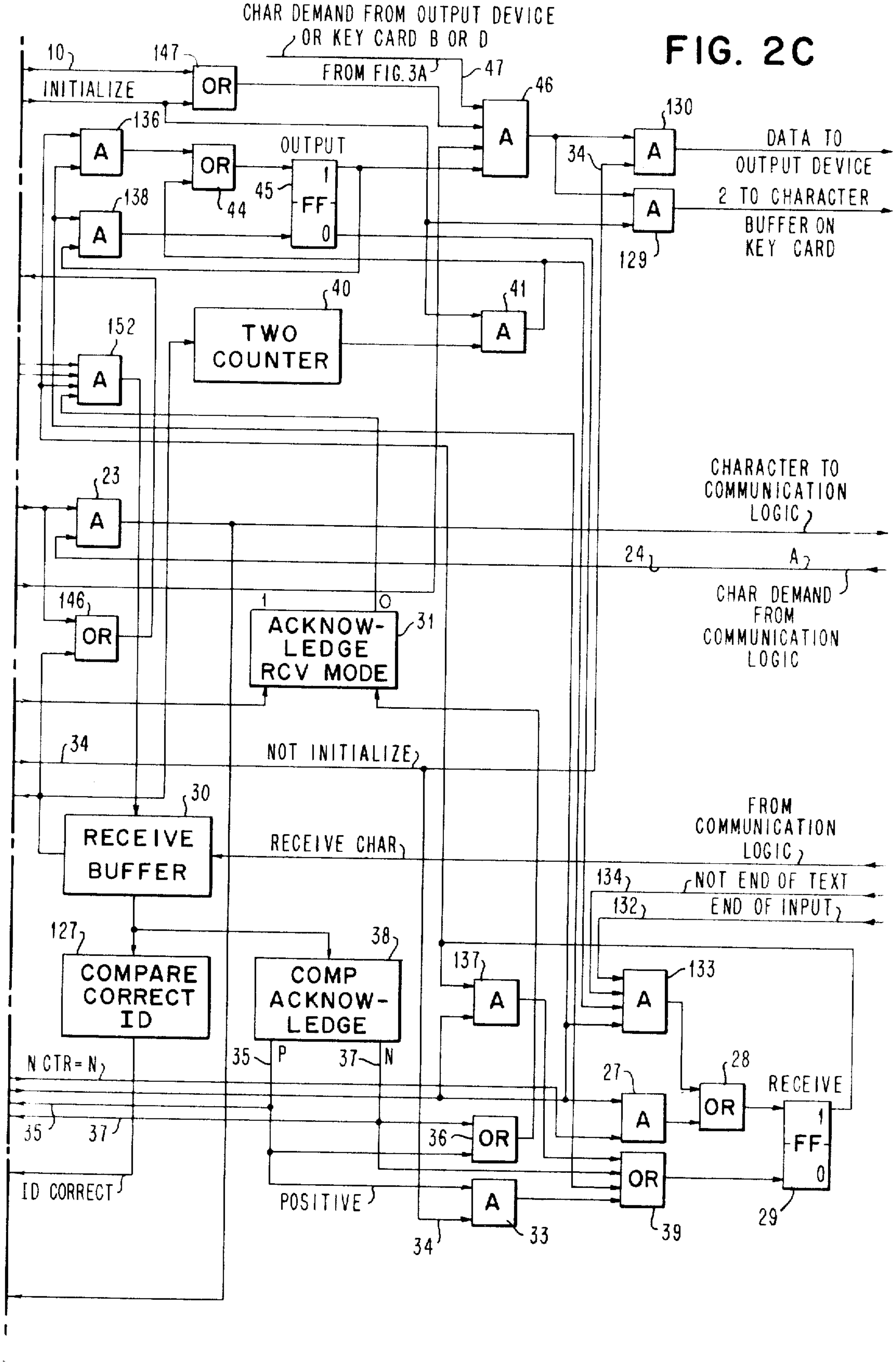

The timing charts of FIGS. 4 and 5 are intended to consolidate in graphic form the sequence of events which occur under the control of an appropriate "clock" or basic source of timing signals. The "clock" is not shown, for clarity, since it is well within the state of the art to construct clocks based on digital oscillators, for example, to provide the desired sequence of timing signals. The logic circuits illustrated in FIG. 2a through 2c are designed to operate in sequential steps from a given starting timing pulse, TP-0. This means that the functions which are spelled out on the timing charts will occur at the designated times if the conditions precedent to each function are met. If any condition is not met, then further operation in that column is halted until the condition is met. The charts are designed to be followed vertically in columns from top to bottom beginning at the upper left-hand corner and working across the tables column by column. The timing signals TP-0 through TP-7 are relative to one another and are chosen so that the logic circuits can function as described without conflict. The stepping of buffers, reading out of ROS contents, etc., are all controlled by signals TP-0 through TP-7 from a basic clock. To avoid undue complexity in the circuit diagrams, the clock pulse lines connected to the various logic devices have been, in most cases, omitted or have instead been indicated merely by "TP" designations on the affected parts of the circuit. It is obvious to anyone of skill in the art to construct the clock and connect it to control the various elements in FIG. 2 in the sequence designated in the timing charts.

Blank boxes in the charts mean that the circuit is not performing at that time, but is waiting for other operations in other devices to be completed. For example, at TP-7, in the first column of FIG. 4, the key card logic is idle while the I/O control logic of FIG. 5 is busy resetting the N counter to 0. Only one operation takes place at any one time on the portion of the device in FIG. 4, but operations may occur simultaneously on the portion of the device in FIG. 5.

The single encrypted character will be received at the input/output controller and will be decrypted and compared against a known correct identification in the input/output control. If a comparison is found, the system will be removed from its initialization state, the input/output device will be unlocked, and the operator can proceed to communicate with the CPU as desired. If identification of the operator only, was all that was desired, identification is completed at this point.

If the operator wishes to communicate with the CPU, he can now elect to operate in either an encrypt data mode or in a clear data mode. This would be required, for instance, when certain data banks in the CPU are to be restricted to specific persons (who are issued the proper I.D. key cards) and when the transmission of the contents must be performed in a secret or encrypted mode to maintain security of the data. The key generating device on the operator's key card is used to provide a pseudo-random bit generating function to encrypt and to decrypt characters being transmitted from and being received by the input/output controller. When operating in the encrypt mode, as discussed above, the CPU generates a matching string of pseudo-random bits to be utilized in decrypting and encrypting the data received from the input/output controller and to be sent to it.

DETAILED DESCRIPTION

Figures 3, 3A:
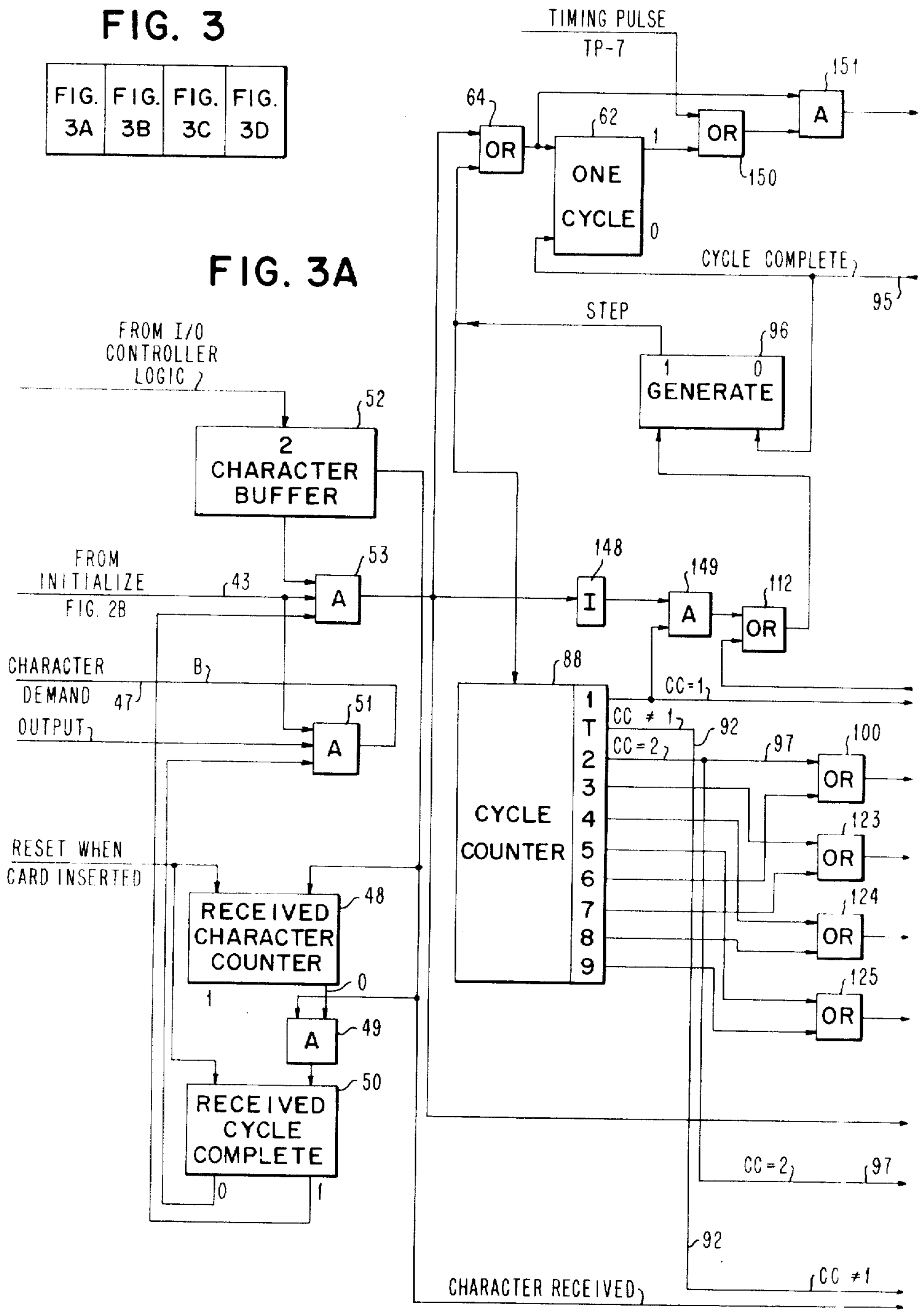
FIG. 3 is a layout showing the arrangement of the sheets of drawings which make up FIGS. 3*a* through 3*d*.
FIGS. 3*a* through 3*d* illustrate logic circuits for one embodiment of the key card of this invention.
Figure 3B:
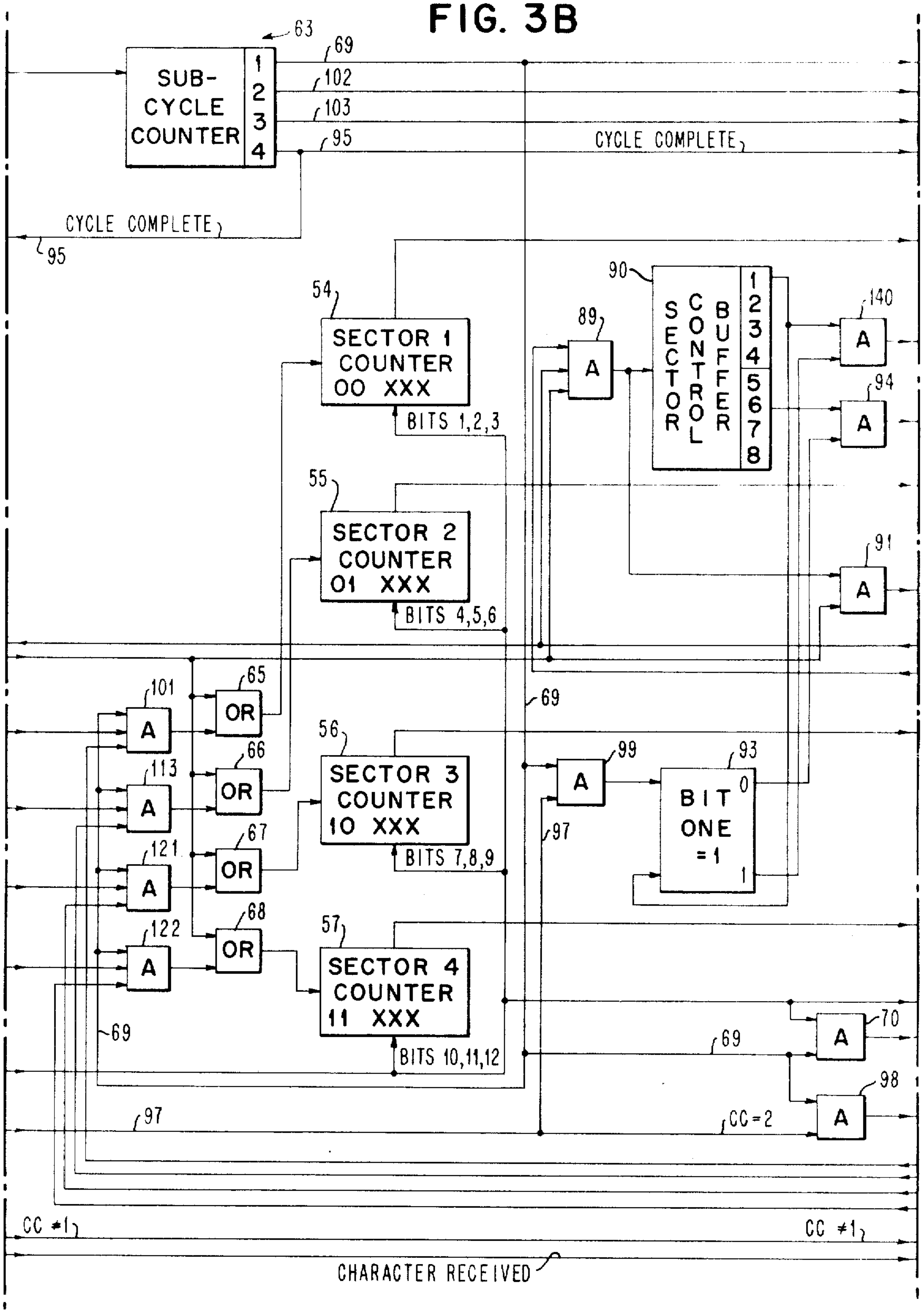
Figure 3C:
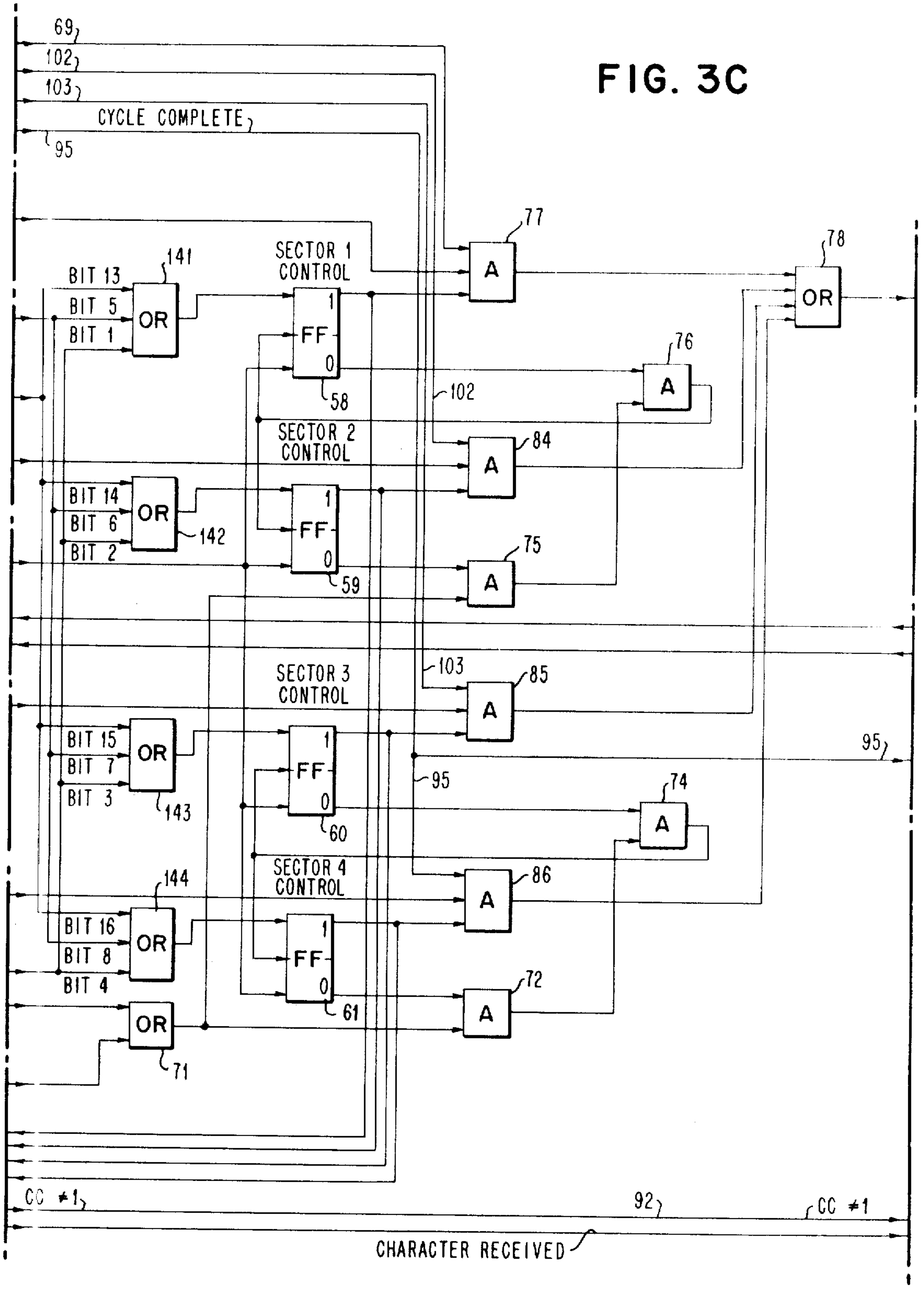
Figure 3D:
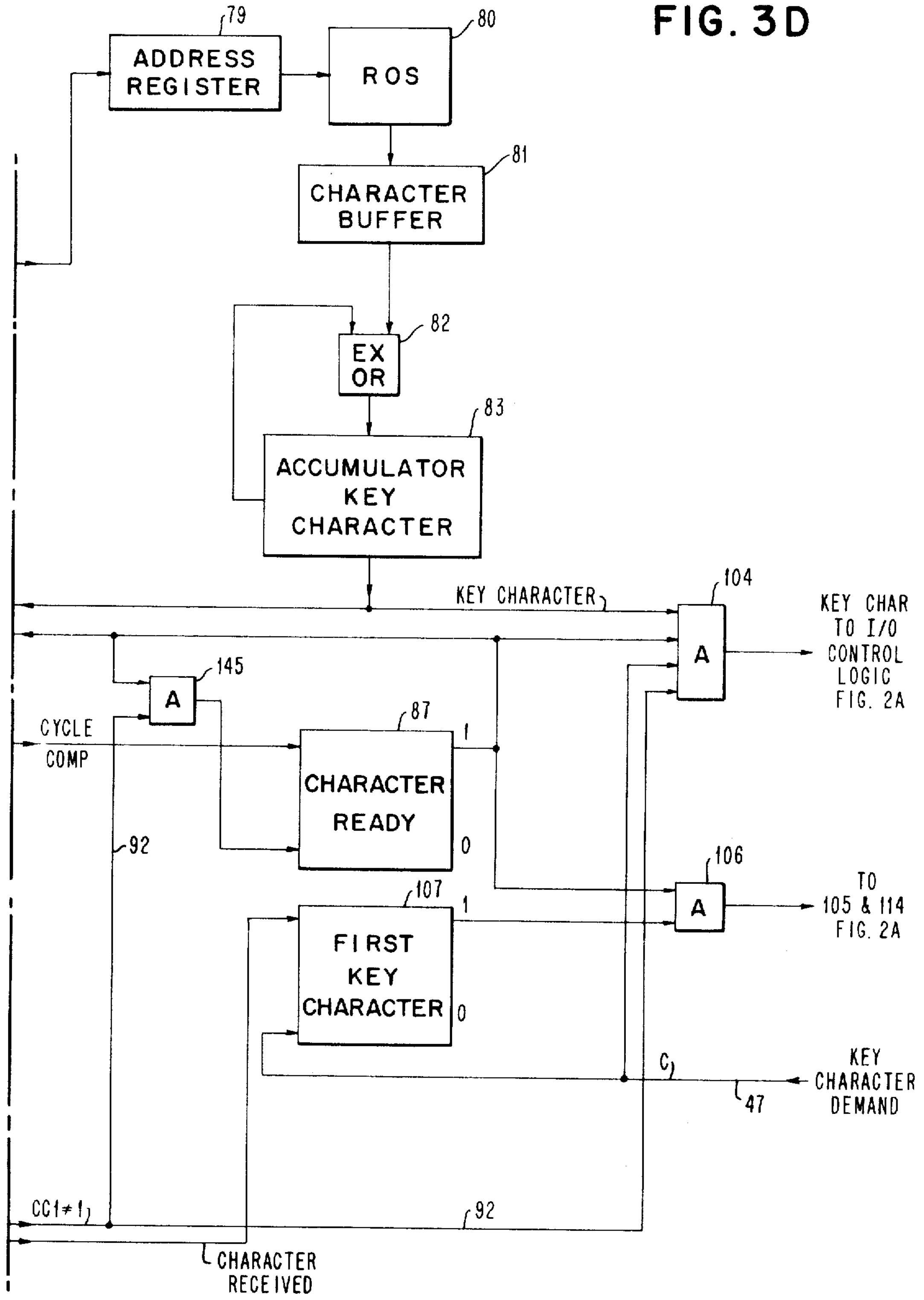

The above general description may be embodied as illustrated in FIGS. 2 and 3. Since the discussion of this circuitry also exhibits its mode of operation, a separate mode of operation section in this specification is not necessary. Instead, this detailed description will proceed in a step by step sequence of operations involved in one complete operator identification cycle, one example of communication of data following a successful identification with the data being transmitted in the clear mode, and one example of the operation of the system with data being transmitted in an encrypt-decrypt mode.

For the sake of clarity, separate examples of the operations carried out in the above three functions of the system will be discussed separately with alphabetic step designations used to separate the various portions within each part of the discussion.

Turning now to FIGS. 2 and 3 a preferred embodiment of the invention is illustrated, and it will be assumed that identification of an operator bearing some sort of key card is the desired function.

Step A: Key means or I.D. card 1 carried by the operator is inserted into the reader device for the card illustrated in FIG. 1. The insertion of the card closes electrical contacts (not shown for the sake of clarity) to supply power to the circuit devices on the card, and to initiate operation of the system. Closure of the appropriate contacts by the key card sets initialize flip flop 2, the first transmission flip flop 3, and the input flip flop 4 to an arbitrarily designated 1 (on) condition. Insertion of the card also causes the I.D. complete flip flop 5 and the I.D. correct flip flop 6 to be reset to the 0 (off) condition. Level setter 7, on sensing the closure of a contact by the card 1, sets a signal level to condition one leg of AND gate 8. The other leg of AND gate 8 is conditioned by the I.D. complete flip flop 5 being in the 0 (off) state which is set, as previously mentioned, by inserting the key card 1. The output from I.D. complete flip flop 5, when it is in the 0 state, goes through OR gate 9 to condition the second leg of AND gate 8, and thus produces the unlock signal 10.

Step B: With the unlock signal 10 present, and with input flip flop 4 being set to the on condition, the operator may now enter via a keyboard or other suitable device, N characters of I.D. data 11 which are memorized by the operator to identify to the response means or CPU the particular ROS carried on his key card 1. Each character of data entered by the operator is moved into the N character buffer 12. As each character enters buffer 12, the N character counter 13 is incremented by 1. If the operator enters a sufficient number of N characters, N character counter 13 will produce a signal output when the N characters entered equal in number a preset arbitrary quantity N. At this signal, input flip flop 4 is reset to 0 (off). This turns off ready light 14 and the operator is thereby told that no further entry can be made until it comes on again. The signal from N counter 13 also conditions one leg of a three-way AND gate 15. The other two legs of AND gate 15 are conditioned by the initialize flip flop 2 being on and the I.D. correct flip flop 6 being off. When these conditions are attained, AND gate 15 has all three legs conditioned, and will produce an output to set I.D. complete flip flop 5 to the on condition. When the I.D. complete flip flop 5 turns on, the 0 output level which had existed at OR gate 9, disappears and the input to AND gate 8 also disappears, which causes the unlock signal 10 to disappear as well. This locks the inputs and outputs until the system is ready for additional operator identification input.

Step C: When the input flip flop 4 is turned off by the N character counter 13 reaching a count of N, the off condition gives an input to OR gate 16, the output of which will set transmit flip flop 17 to the on condition. The on condition of transmit flip flop 17 conditions AND gate 18 to allow parallel transfer of, for example, 8 bit characters to the TXMT buffer 19. At this point, it is apparent that the output of AND gate 20 will not be present because the first transmit flip flop 3 is at "1" and, hence, AND 20 is in the off condition. Transmit flip flop 17 being on also conditions one leg of AND gate 20, but the other leg of AND gate 20 is not conditioned because of the first transmission flip flop 3 being on as just discussed. This means, that until the first transmission is complete and the first transmission flip flop 3 is reset, that the contents of key buffer 21 (which would be a key encryption character) cannot be Exclusively OR'ed by Exclusive OR 22 with the content (the data character for transmission) of transmit buffer 19. Therefore, any data transmitted from transmit buffer 19 will be unencrypted. This means that the ROS identification entered by the operator is not encrypted. If this signal were monitored by an unauthorized person, the security of the system would still remain unimpaired because a valid key card is going to be necessary for access to the system as will soon become apparent. When the TXMT buffer 19 is full, AND gate 23 is conditioned and is ready to transmit upon receipt of a character demand signal from the communication system on line A. Upon receipt of character demand signal A, a single character is outputted from transmit buffer 19 as an 8 bit parallel signal to the communication logic for transmission to the CPU.

Step D: Each time a character is sent to transmit buffer 19 from the N character buffer 12, the output transfer, upon going through OR 25, steps the N character counter 13. The process continues until N character counter 13 reaches an arbitrarily set limit N. When the N counter 13 equals N, AND gate 26 is conditioned by transmit flip flop 17 being on and by the N counter 13 equals N signal. The output of AND gate 26 clears the transmit flip flop 17. Simultaneously occurring with the N counter 13 equal N signal and the transmit flip flop 17 being on, AND gate 27 is fully conditioned which causes an input through OR gate 28 which sets the receive flip flop 29 for handling the acknowledgement of transmission. If the data was transmitted without error, a positive acknowledge character from the communications system, which is not a part of this invention, will be received in receive buffer 30. If a positive acknowledge signal is received, it will be detected without decryption due to the fact that the acknowledge receive mode flip flop 31 is not set, and the XOR 22 is not enabled. Acknowledge receive mode flip flop 31 is not set due to the fact that AND 32 was previously conditioned by the N counter 13 equal N signal and the transmit flip flop 17 being on. Thus, the 0 output of acknowledge receive mode flip flop 31 is not present, so AND gate 32 is deconditioned. The positive acknowledge signal will propagate through AND gate 33 and will be blocked by a "not initialize" signal 34 produced by the 0 condition of initialize flip flop 2. The output of the positive acknowledge signal 35 going through OR gate 36 will clear the acknowledge receive mode flip flop 31. During the initialize mode, the positive acknowledgement signal 35 will set up a condition so that receive flip flop 29 will continue to receive in the 1 state. A negative acknowledge signal 37, however, would be received if an error occurred in transmission. This will activate the N compare acknowledge 38 which will produce a signal passing through OR gate 36 to reset the acknowledge receive mode flip flop 31 which will pass through OR gate 39 to reset the receive mode flip flop 29. It will also pass to OR gate 16, setting transmit flip flop 17 to retransmit the contents of N character buffer 12 which is carried out by the process just described.

Step E: Assuming that a positive acknowledge signal 35 was received, the controller logic will remain in the receive mode and is still in the initialize state. The CPU, upon recognizing a valid, unencrypted identification code, (that is, one with the proper number of bits and which finds a match in the CPU memory) will select from storage the proper ROS bit pattern which corresponds to that code. It will load the corresponding ROS bit pattern into its memory and will then independently generate two random characters which will be transmitted to the input/output controller. The two random characters will be received at the receive buffer 30 and loaded into the N character buffer 12. Each incoming character steps the "2 counter" 40 of FIG. 2c. When "2 counter" 40 equals 2, AND gate 41 is conditioned by the signal 42 produced by "2 counter equals 2" and the initialize flip flop 2 being equal to 1. (Signal 43.) The output of AND gate 41 will pass through OR gate 44 and set the output flip flop 45. OR gate 39 of the input/output controller logic will also receive the output of AND gate 41 and will clear the receive flip flop 29.

Step F: An output cycle will now begin with AND gate 46 conditioned by the output flip flop 45 and a character demand signal B being present from the key card 1. The first character received by the key card logic complements the receive character counter 48. At this point, AND gate 49 is not conditioned. When the second character is received, AND gate 49 is conditioned and the load cycle complete flip flop 50 is set to 1. AND gate 51 is deconditioned at this time and the character demand signal B to AND gate 46 disappears, ending the transfer of data. The "2 counter equals 2" signal 42 goes through OR gate 39, clearing the receive flip flop 29.

Step G: There are now 16 bits of transmitted priming character data in the 2 character buffer 52. AND gate 53 is conditioned by the load cycle complete flip flop 50 being in the 1 condition, the initialize signal 43, and by the fact that 16 bits of data are in the 2 character buffer 52. Bits 1, 2, and 3 will enter the XXX portion of sector counter 5. Bits 4, 5, and 6 will enter the XXX portion of sector counter 55. Bits 7, 8, and 9 similarly enter sector counter 56 and bits 10, 11, and 12 enter sector counter 57. Bit 13 enters sector control 58. Bit 14 enters sector control 59, and bits 15, and 16 enter sector controls 60 and 61 respectively. The key card will now proceed to generate key character bits until it is stopped.

Step H: At this point, the cycle counter 62 is set at 1, and the subcycle counter 63 is ready to start at 1. AND gate 53 produces an output signal which is fed to OR gate 64, the output of which sets the subcycle counter 63 to 1 through OR gate 151, and the first generation subcycle begins. The input to OR gate 64 is carried down to the invert function 148 and is used to decondition AND gate 149 so that the generate flip flop 96 is not set. This is done to prevent cycle counter 63 from stepping off and starting at the number 2 position during the initialization process. Since cycle counter 62 is equal to 1, the input to OR gate 64 through 68 will be conditioned and a signal will propagate to the sector counters 58 through 61, causing each of them to step one count. In similar fashion, a transfer is made of a signal through AND gate 53 which, together with a signal from subcycle counter 69 equals 1, causes AND gate 70 to be conditioned. This causes OR gate 71 to produce an input to AND gate 72. If pairs sector control conditions 73 are 0, the signal will propagate through AND gates 72 and 74 and/or 75 and 76 causing sector controls 60 and 61 and/or 58 and 59 to be complemented. This is necessary since all zeros would produce no output from the ROS. If the specified pairs of the sector control conditions 73 are not 0, the propagation will stop and sector controls 58 through 61 will not be complemented.

Step I: The signal 69, produced when the subcycle counter 63 equals 1, causes the read out of the step counter 54 if AND gate 77 is conditioned by the sector control 58 being on (the 1 state). If sector control 58 is on, the content 00 and bits 1, 2, 3 (00XXX) is passed through AND gate 77 and OR gate 78 to address register 79. Address register 79 causes the read out of the contents of ROS 80 at the address specified by the 5 bits 00XXX. The read out occurs into the character buffer 81 from which it is Exclusively OR'ed in Exclusive OR circuit 82 with the contents of accumulator 83 (which at this point contains nothing having been previously cleared). If AND gate 77 were not conditioned, sector counter 54 would not be read out and the address content would not appear in accumulator 83.

Step J: The subcycle counter 63, which is stepped by a timing pulse at TP-7 through AND gate 150 whenever 1-cycle flip flop 62 is equal to one, which is set at the start of each generating cycle, now steps to 2. If AND gate 84 is now conditioned by sector control 59, 5 bits (01XXX) are read through AND gate 84 to OR gate 78 and into the address register 79. The specified address will be read out of ROS 80 into character buffer 81 from which it will be Exclusively OR'ed by Exclusive OR 82 with the contents of accumulator 83 (which now contains the result of the previous step). The results will remain in accumulator 83. If AND gate 84 is not conditioned by sector control 59, then there will be no read out from the ROS in this step.

Step K: The subcycle counter now steps to 3. If AND gate 85 is conditioned by sector control 60 being in the 1 condition, sector counter 56 contents (10XXX) is read through AND gate 85 to OR gate 78 and into the address register 79. The corresponding address will be read from ROS 80 into the character buffer 81. The data in character buffer 81 will then be Exclusively OR'ed by Exclusive OR circuit 82 with the content of the accumulator 83. If AND gate 85 is not conditioned by sector control 60, no read out from ROS 80 will occur in this step.

Step L: Subcycle counter 63 now steps to 4. Sector counter 57 contents (11XXX) is read out if AND gate 86 is conditioned by sector control 61 being at a 1. It passes through AND gate 86, OR gate 78, and into address register 79. A corresponding address is read out of ROS 80 into character buffer 81 from which it is Exclusively OR'ed with the content of accumulator 83. The signal produced by the subcycle counter 63 reaching 4 also sets the character ready flip flop 87 to a 1 condition. Since the cycle counter 88 is still equal to 1, AND gate 89 is conditioned and the content of accumulator 83 moves to the sector control buffer 90 through AND gate 89. This load is sensed and AND gate 91 is conditioned by cycle counter 88 equal to 1 and sector controls 58 through 61 are cleared by the output of AND gate 91. Simultaneously, bit 1 in the sector control buffer 90 is sensed, and if it is a 1, the bit 1 equals 1 flip flop 93 is set. This causes bits 1, 2, 3, and 4 respectively, from buffer 90 (which now contains the results of the previous steps) to load through AND gate 140 into sector control 58, bit 2 into sector control 59, bit 3 into sector control 60, and bit 4 into sector control 61 through OR gates 141 through 144 respectively. If by chance, bit 1 in sector control buffer 90 is a 0, then AND gate 94 is conditioned and bits 5, 6, 7, and 8 from buffer 90 will be loaded respectively, into sector controls 58 through 61 instead of bits 1 through 4.

Thus, it appears that by the end of the time at which cycle counter 88 equals 1, the initial content of the sector control flip flops 58 through 61 has been changed from the four bits transmitted to it by the CPU as part of the two encrypted priming characters to four new "random" bits generated by the system in a pattern dependent upon the ROS carried on the card. When the subcycle counter 63 equals 4, signal 95 also stops the generated cycle flip flop 96 and the 1 cycle flip flop 62. The emptying of key accumulator 83 through AND gate 89 is sensed and the generate flip flop 96 is again set to the 1 condition as is 1 cycle flip flop 62. As it sets, cycle counter 88 will step to 2.

Step M: When the 1 cycle flip flop 62 sets to a 1, cycle counter 88 is stepped to 2 and the 1 cycle flip flop 62 is set through OR gate 64. This will start a cycle over again with subcycle counter 63 equal to 1. As soon as cycle counter 88 equals 2 (signal 97) and subcycle counter 63 equals 1 (signal 69), AND gate 98 will produce an output which checks for the presence of all 0's in sector control 58 through 61. If all 0's are present, AND gates 72, 74, 75, 76 produce an output complementing the sector control flip flops 58 through 61. If not all 0's are present, the complement of the sector control flip flops 58 through 61 is not propagated and whatever is in them, is used. At the same time, AND gate 99 is conditioned by cycle counter 88 equals 2, (signal 97) and the subcycle counter 63 equals 1 (signal 69) causing the bit 1 equals 1 flip flop 93 to be reset to 0 if it was previously set. Cycle counter 88 equal to 2 (signal 97) will cause OR gate 100 to have an input which is connected to AND gate 101. This, along with the signal from subcycle counter 63 equal 1 (signal 69) and a signal produced if sector control 58 equals 1, will cause AND gate 101 to output through OR gate 65 to step sector counter 54 one count (this increments by 1 the former 00XXX contents). Sector counter 54 is now read out if sector control flip flop 58 is equal to 1. If it is not equal to 1, then sector counter 54 is neither read out nor stepped. If read out does occur, it carries bits 00XXX (which now represent the original load of bits 1, 2, 3 from the priming character incremented by one) through AND gate 77, OR gate 78, and into the address register 79. This will cause the corresponding data in ROS 80 to be read out into character buffer 81 to be Exclusively OR'ed 82 with the cleared accumulator 83.

Step N: The subcycle counter 63 now steps to 2 (signal 102). This causes AND gate 84 to be conditioned on one leg. If the sector control flip flop 59 is set to a 1, sector counter 55 reads out bits 01XXX (as incremented) through AND gate 84, and OR gate 78 to address register 79 in a repeat of the process in the previous step. This will cause read out of a corresponding address from ROS 80 into character buffer 81 from which the data will be Exclusively OR'ed 82 with the contents of accumulator 83. If the sector control flip flop 59 is not set, no read out occurs because the address transfer is stopped by AND gate 84.

Step O: The subcycle counter 63 now steps to 3 (signal 103). This signal conditions AND gate 85. If sector control flip flop 60 is on, bits 10XXX (as incremented) are read through AND gate 85 and OR gate 78 into the address register 79. This will cause the selection of an address in ROS 80 to be read out into character buffer 81 and to be Exclusively OR'ed 82 with the content of the accumulator 83.

Step P: The subcycle counter 63 is now stepped to 4 (signal 95). At this point, a read out is attempted for sector counter 57, because AND gate 86 is conditioned by signal 95. If sector control 61 is in the 1 condition, bits 11XXX (as incremented by one) are read out of sector counter 57 through AND gate 86 and OR gate 78 to the address register 79. This will cause the read out of a corresponding address content from ROS 80 into character buffer 81 from which it is Exclusively OR'ed 82 with the content of the accumulator. This completes the generation of the first key code character, since the 8 bits are generated completely from the ROS beginning from a starting point given by the priming characters.

Signal 95 now sets the character ready flip flop 87 which raises one leg of AND gate 104. When the character demand signal C appears, since cycle counter 88 is not equal to 1 at this point, the accumulator 83 contents will be outputted through AND gate 104 as described below, to key buffer 21. At this point, the generate cycle flip flop 96 and the 1 cycle flip flop 62 will be cleared by signal 95 and a new subcycle will not begin until the accumulator 83 is cleared.

Step Q: AND gate 105 is conditioned by the initialize flip flop 2 in its 1 state (signal 43) and the output of AND gate 106 which is conditioned by the first character flip flop 107 and the character ready flip flop 87. The output of AND gate 105 passes to OR gate 108 and its output sets the demand key character flip flop 109. This sends a key character demand signal C to AND gate 110 which is conditioned by the not first transmission flip flop 3 (signal 111), (the 0 output). AND gate 110 passes the key character demand signal C to AND gate 104. The fact that cycle counter 88 does not equal 1 conditions AND gate 145 which will cause the character ready flip flop 87 to clear when the generated key character is transferred to the input/output controller logic. Since cycle counter 88 is not equal to 1, and the character ready flip flop 87 is set, AND gate 104 produces an output which carries the 8 bit key character just generated to the key buffer 21. First demand key character flip flop 109 is set to 0 by key character demand signal C. The key character demand flip flop 109 is reset to 0 by the character received condition of key buffer 21. When the generated key character leaves the accumulator 83, the "key accumulator empty" condition occurs which results in an input to OR gate 112 which resets the generate flip flop 96 to a 1.

Step R: Setting the generate flip flop 96 to a 1 steps the cycle counter 88 to 3 and passes an input through OR gate 64 to set the 1 cycle flip flop 62 and begin another subcycle count with the subcycle counter 63 equal to 1 (signal 69). If sector control 59 is equal to 1, an output from AND gate 113 passes to OR gate 66, and propagates to step the sector counter 55 by one more count. If sector control flip flop 58 has a 1, the content of sector counter 54 is read through AND gate 77 and OR gate 78 into the address register 79. This causes address 00XXX (as now incremented twice) in the ROS 80 to be read out into character buffer 81. The content of character buffer 81 is Exclusively OR'ed 82 with the empty accumulator 83 and is placed in accumulator 83. If the sector control 58 is not conditioned (a 1), the read out will not occur.

The process continues from this point by stepping subcycle counter 63 to 2. This will result in testing AND gate 75 to determine if sector control flip flop 59 is at a 1. If a 1 is found, sector counter 55 contents are read through AND gate 84 and OR gate 78, into address register 79. The read out from the ROS 80 and the Exclusive OR process followed by storage in an accumulator 83 repeat. The subcycle counter is stepped to 3. If the sector control flip flop 60 is a 1, sector counter 56 contents are read through AND gate 85, OR gate 78, and into address register 79. The Exclusive OR process is repeated and the subcycle counter 63 is stepped to 4. Once again, the read out and Exclusive OR and store processes are repeated if conditions are met. Thus, the second generated key character will be made ready.

In the previous step, the generation of the first "key character ready" signal cleared I.D. complete flip flop 5 to a 0 through OR gate 114. This signal will propagate through OR gate 9 and AND gate 8 to unlock the keyboard input at AND gate 115 and turn on ready light 14 for the operator through AND gate 116. At that point, the operator can enter (via a keyboard not shown) N characters of personal identification data for transmission 11 through AND gate 115 and OR gate 117 to the N character buffer 12. When the N counter 13 equals N (signal 118), the transmit flip flop 17 is turned on (set to a 1) through AND gate 26. At this time, the input flip flop 4 is cleared to 0 and the I.D. complete flip flop 5 is set to 1 again, which removes the conditioning of AND gate 8 and causes the unlock condition 10 to disappear. This locks the keyboard until initialization is complete. During this time the preceeding step (step R) was occurring, producing the second generated key character while the operator was entering the identification characters.

The first character moves for transmission through AND gate 18 to the transmit buffer 19 (8 bits in parallel). Since AND gate 119 is conditioned by the initialize signal through OR gate 120, the first transmit flip flop 3 equals a 0, and the transmit flip flop 17 is equal to 1 through AND gate 20, the content of key buffer 21 (the first generated key character) is Exclusively OR'ed by Exclusive OR 22 with the content of the transmit buffer 19 (the identification character to be transmitted first). Note that the content of the transmit buffer 19 will move through OR gate 146 and enter the Exclusive OR process just explained. The other leg of OR gate 146 allows the content of the receive buffer 30 to be Exclusively OR'ed with the content of key buffer 21 during a receive operation to decrypt the received data.

The result of this operation is transmitted through AND gate 23 when the character demand signal C appears. When AND gate 23 sends data, key character demand signal C is set and this gates a new key character (generated while the operator was inputting data in the previous step) into key buffer 21. The next character is moved from the N character buffer 12 through AND gate 18 to the transmit buffer 19. From there, it is Exclusively OR'ed 22 with the contents of key buffer 21. The content of transmit buffer 19 then waits for a character demand signal A.

Step S: At this point, the second encrypted character is transmitted. This results in setting the generate flip flop 96 to 1, stepping the cycle counter 88 to 4, and passing an input through OR gate 64 to set the 1 cycle flip flop 62 to begin another subcycle count 63 at subcycle equal 1 (signal 69). If sector control 60 is equal to 1, an output from AND gate 121 will pass an input through OR gate 67 and propagate to step counter 56 by one more count. If sector control flip flop 58 has 1 output, the content of sector counter 56 (00XXX), as incremented, is read through AND gate 77 and OR gate 78 into the address register 79. The process repeats from this point, as discussed above, until a third character is transmitted.

The same series of steps is continued until a fourth, a fifth, a sixth, a seventh, and an eighth character have been transmitted. In general, the process may continue through N stages of cycle counter 88 until the generate flip flop 96 steps the cycle counter 88 back to 1. This causes a control cycle generation to repeat as in steps H through M and to be followed again by steps N through S. The process continues repetitively until N character counter 13 is equal to N (signal 118) at which time transmission of an operator identification code consisting of N encrypted characters is complete.

Step T: The acknowledge receive flip flop 31 is set by N counter equal to N signal 118 and the transmit flip flop 17 being 1. Transmit flip flop 17 was cleared by the fact that it was on and the N counter equal to N signal 118 appeared. N counter equal to N signal 118 and transmit flip flop 17 being on also condition AND gate 27 to set the receive flip flop 29. When the acknowledge signal is received, if positive (signal 35), it will set acknowledge receive mode flip flop 31 to 0. Through OR gate 36, it will reset the input flip flop 4 through OR gate 126 to a 1. AND gate 33 will block resetting the receive flip flop 29 due to the initialize flip flop 2 not being in the 0 state at this point. If a negative acknowledge signal (37) is received, the acknowledge receive mode flip flop 31 is cleared through OR gate 36 and the receive flip flop 29 is cleared through OR gate 39 while the transmit flip flop is reset through OR gate 16. This will cause retransmission of the N character buffer contents 12. Note, that the "unlock" function 10 also enters OR gate 147, unlocking the output function which will be used to serve as one of the conditioning levels to AND gate 46 now that the initialize flip flop 2 is cleared. Thus the output function is unlocked.

Step U: The CPU, by a key generating program utilizing the identical ROS configuration, generates a string of N key encryption characters the same as the N characters that were in the N character buffer. As the CPU receives the N characters of encrypted identification data from the terminal, it decrypts them with a generated key character stream by an Exclusive OR process and compares the received identification characters against a list of prestored operator I.D. codes. Assuming they compare, a correct compare identification character is encrypted by mixing the generated key character N + 1 and transmitted to the input/output controller logic and arrives in the receive buffer 30. Since AND gate 152 is conditioned by the initialize signal through OR gate 120, receive flip flop 29 equal to 1, and the acknowledge receive mode flip flop 31 equal to 0, the received encrypted identification character in the receive buffer 30 is run through the Exclusive OR 22 with the contents of key buffer 21, which will contain generated key character $N + 1$, and is thus decrypted, the result appearing in the receive buffer 30. The resulting decrypted character is compared with a known correct identification code. The known correct identification is prewired into the terminal controller logic and may be of any desired type. For clarity, it is not shown herein. The character, or characters, representing this known correct identification, come from the CPU encrypted (apparently with a random bit content on the communication line) and arrive at the receive buffer 30. They are then decrypted, as previously explained, so that the comparison step can take place. Only a valid key card with an ROS which matches that found in the CPU can successfully decrypt the incoming data to have a correct compare of the I.D. character against the known correct prewired character. The comparison signal result appears from the compare correct I.D. block 127 output. This output sets the I.D. correct flip flop 6 which clears the initialize flip flop 2. The initialize flip flop 2 being equal to 0 (the one level drops) causes AND gate 105, AND gate 128, and AND gate 129 to be deconditioned. Initialize flip flop 2 equal to 0 also conditions AND gate 130 and AND gate 33. The input flip flop 4 was previously set by a positive acknowledge level (signal 35) and the I.D. correct flip flop 6, now equal to 1, propagates a signal through OR gate 9 and brings up the second leg of AND gate 8 giving the unlock level 10 to AND gate 116 and to AND gate 115. Thus, the initialize and identification phase is ended. AND gate 116 is conditioned and the ready light 14 is on so that the operator is now ready to enter the transmit data mode.

TRANSMIT DATA MODE — CLEAR

Step A: The operator now has the choice of operating in the encrypt data mode or in the clear data mode. If he chooses to operate in the clear mode, OR gate 120 does not have an input from the operator-selected encrypt function 131 or from the initialize flip flop 2. The output or OR gate 120 will not condition AND gate 119 and 152. Therefore, encryption and decryption of transmitted data cannot occur through Exclusive OR 22.

Step B: As 8 bit parallel data characters enter through AND gate 115, they propagate through OR gate 117 stepping the N character counter 13 as they enter the N character buffer 12. When the N character buffer 12 is full, N character counter 13 equals N, signal 118 occurs and the input flip flop 4 is cleared, setting the transmit flip flop 17 through OR gate 16. Transmit flip flop 17 in turning on, conditions AND gate 18 and moves a character to AND gate 26 when the character demand signal from the communication logic A occurs. This movement of characters steps N counter 13 through OR 25 and continues until the N counter is equal to N signal 118 which will set up the acknowledge receive mode flip flop 31 and set the receive flip flop 29 through AND gate 27 and OR gate 28. When a positive acknowledge signal 35 is received, it will set the input flip flop 4 to a 1, clear to 0 the acknowledge receive mode flip flop 31, and clear to 0 the receive flip flop 29 through AND gate 33 and OR gate 39. At this point, the operator can enter another N data character.

Step C: When the transmission input is ended by the operator, an end of input button 132 conditions AND gate 133 which has its other legs conditioned by the "not end of text" signal 134 from the communication logic, the N counter equal to N signal 118, and the output flip flop 45 equal to 0. Thus, AND gate 133 receives an input and the receive flip flop 29 is set to 1. After N characters are received in the N character buffer 12 through the receive buffer 29 and the OR gate 117, the N counter equal to N signal 118 will feed to AND gate 136 as conditioned by receive flip flop 29 equal to 1. This signal will go through OR gate 44 and set the output flip flop 45 to 1. The N counter equal to N 118 and receive flip flop 29 being on will condition AND gate 137 and set the receive flip flop 29 to 0.

The output flip flop 45 equal to 1 will condition AND gate 46. The other leg of AND gate 46 is conditioned by the character demand signal D from the output device. Every time a character demand appears, one character will go from the N character buffer 12 through AND gate 46 and AND gate 130 to the output device. AND gate 130 is conditioned by the "not initialize" signal which is produced by initialize flip flop 2 equal to 0. After N characters, the N counter equals N signal 118 will clear the output flip flop 45 through AND gate 138. The output equal to 0 condition causes AND gate 133 to again input through OR gate 28 and start the receive operation by setting the receive flip flop 29 again for N characters.

This process will continue to alternate between receive and output until an "end of text" signal from the operator is detected in the communication logic ending the receive mode of operation by deconditioning AND gate 133 so that the receive flip flop 29 cannot be reset after the last output.

Step D: The operator can return to input additional data or end the operation by removing key card 1. When key card 1 is removed, level setter 7 drops the input to AND gate 8 which releases the unlock signal 10 level at the output. This deconditions AND gate 115 and AND gate 116 and AND gate 51, thus locking the terminal controller logic from either input or output operation.

DATA MODE ENCRYPT

Step A: The operator may choose to operate in encrypt data mode. If so, he will press the encrypt data mode button 131. This will cause OR gate 120 to decondition and will condition AND gates 119 and 32.

Step B: The operator inputs N characters of data through AND gate 116 and OR gate 117 to the N character buffer 12. At the end of N characters, N counter equal to N signal 118 clears the input flip flop 4 through AND gate 139. The output of input flip flop 4 equal to 0 sets the transmit flip flop 17. The 1 level of the transmit flip flop 17 and the 0 level of the first transmission flip flop 3 condition AND gate 20 and bring up the last leg of AND gate 119. The transmit flip flop 17 conditions AND gate 18 which will move a data character to the transmit buffer 19 to be Exclusively OR'ed by Exclusive OR 22 with the contents of the key buffer 21 (which at this point is generated key character $N + 2$). The operation then picks up the process at the step where the identification finished in the first example given above. N data characters are transmitted by cycling through the same process for I.D. encryption contained in steps F through S above.

Step C: When the acknowledge signal is received, AND gate 33 will be conditioned by the "not initialize" signal 34 produced by the initialize flip flop 2 being equal to 0. This will clear receive flip flop 29, the input flip flop 4 will be set to 1 through OR gate 126, and the acknowledge receive mode flip flop 31 is cleared to 0 through OR gate 36.

Step D: When transmission input is ended by the operator, step C, as under the clear data mode transmission above, occurs again with the exception that the received characters are decrypted by AND gate 152 being conditioned by receive flip flop 29 being set and the conditioning level from OR gate 120 being present. The key generating process is only dependent on the key character demand signal C so that as each character is received, the process described in section N through S applies except that instead of encrypting, AND gate 152 is conditioned to set up decryption in the receive buffer 29 using XOR 22.

Step E: This step is the same as step D in the clear data transmit mode when the receive operations are ended.

ADVANTAGES

An advantage of this invention is that the operator I.D. always appears on the transmission line as an apparently random sequence of N characters identifying the operator, the program, or the data bank to be used at the CPU.

Another advantage is that the I.D. correct check signal or character is an apparently random stream of bits on the transmission line back to the input/output controller from the CPU.

Yet another advantage is that it allows the use of restriction on authorized data banks and programs, such as for leasing purposes, and it makes unauthorized access to CPU programs and data banks very difficult for those not possessing a key card.

Another advantage of the system is that it allows optional data encryption and decryption for sensitive data passing over the communication lines.

Yet another advantage in this invention is that today's large scale circuit integration technology, the key and all of its logic and electronics can be placed on a card small enough to be encapsulated in plastic and carried in a person's pocket like a credit card, and the encapsulation technique prevents unnoticeable tampering with the circuitry in attempts to learn the ROS contents.

But another advantage of this invention is that the key generating logic on the key card is modular and can range from a single sector in an ROS with 8 characters of 8 bits each to as many sectors as desired to vary the amount of key generating capacity before the system will repeat a string of apparently random bits.

Yet another advantage is that the card can only be successfully analyzed, if at all, by sophisticated electronic techniques with computer devices of high power. If the logic circuitry is given a set maximum speed capability, of say 2,400 bps, then even computer analysis techniques to uncover the ROS configuration would take as much as $3 \times 10^3$ hours with an 8 sector 64 bit ROS.

Another advantage is that the card cannot be copied in any fast, easy way.

Still another advantage is that if a card is lost or stolen, the CPU can be cleared of data for the ROS on the card and it will become useless.

While this description of the present invention has been given as an example, it will be understood to those of skill in the art that various changes in form and details may be made therein without departing from the spirit and scope of the invention.

What is claimed is:

1. A cryptographic identification and communications system, comprising:

response means for accepting digital data and responsive thereto for outputting an encrypted pattern comprising a first plurality of digital data bits;

key means connected to said response means and responsive to the input of said first plurality of digital data bits arranged in a pattern for producing a new pattern of data bits; and comparison signalling means connected to said key means for decrypting said encrypted pattern by using said new pattern and for comparing said decrypted pattern with a prearranged valid pattern of digital data bits to determine the validity of said key means and for signalling the results of said comparison.

2. A system as described in claim 1, further comprising:

means for admitting entry to said key means from the operator thereof of a further plurality of digital data bits for processing by said key means to form a second encrypted pattern of data bits for communication to said response means;

a communications channel connecting said key means to said response means for communication therewith; and means associated with said response means for operating upon said second encrypted pattern to decrypt said further plurality of data bits as entered into said key means.

3. A system as described in claim 1, wherein said key means cmprises:

means for storing unique a pattern comprising a plurality of fixed digital data bits;

means for addressing any portion of said storing means and for reading out the portion of said pattern located therein; and means for manipulating read portions of said pattern to create said new pattern of data bits.

4. A system as described in claim 3, wherein said addressing means comprises:

storage means addressing control apparatus; and setting means responsive to digital data control bits for setting said storage means addressing control apparatus to different settings derived from said digital data control bits.

5. A system as described in claim 4, wherein:

said digital data control bits are derived from said read portions of said pattern in said storage means.

6. In a cryptographic communications system in which transmitted data is mixed with an encryption signal comprising a number of generated bits and having response means for encrypting signals for transmission and for decrypting signals received, key means for encrypting signals for transmission and for decrypting signals received and entry means for inputting data bits in a pattern to said key means for producing an encrypted pattern of digital data for transmission to said response means, the improvement comprising:

said key means comprises a means for storing a unique fixed pattern of a plurality of digital data bits;

means for addressing any portion of said storing means and for reading out the portion of said pattern located therein; and means for manipulating read portions of said fixed pattern to create said encryption and decryption control signals.

7. A system as described in claim 6, further comprising:

storage means addressing control apparatus; and setting means responsive to digital data control bits for setting said storage means addressing control apparatus to different settings derived from said digital data control bits.

8. A system as described in claim 7, wherein:

said digital data control bits are derived from said read portions of said pattern in said storage means.

9. Personal identification and cryptographic communications key apparatus, comprising:

means on said key for storing a plurality of digital data bits arranged in a first fixed pattern;

means on said key for addressing any portion of said storing means and reading out the portion of said first fixed pattern located therein;

control apparatus for said addressing means;

setting means responsive to digital data control bits for setting said control apparatus in accordance with signals derived from said digital data control bits; and means for manipulating read portions of said first fixed pattern to create second encryption and decryption control patterns for mixing with data to encrypt or decrypt the same.

10. Key card apparatus as described in claim 9, wherein:

said digital data control bits are derived from said read portions of said pattern in said storage means.

* * * * *